(12) United States Patent
High et al.

(10) Patent No.: US 10,486,831 B2
(45) Date of Patent: Nov. 26, 2019

(54) METHOD AND APPARATUS FOR AN AIRBORNE DRONE TRAINING TRACK

(71) Applicant: Walmart Apollo, LLC, Bentonville, AR (US)

(72) Inventors: Donald R. High, Noel, MO (US); Chandrashekar Natarajan, San Ramon, CA (US); John P. Thompson, Bentonville, AR (US); Michael D. Atchley, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 423 days.

(21) Appl. No.: 15/334,520

(22) Filed: Oct. 26, 2016

(65) Prior Publication Data

US 2017/0113816 A1    Apr. 27, 2017

Related U.S. Application Data

(60) Provisional application No. 62/247,010, filed on Oct. 27, 2015.

(51) Int. Cl.
*B64F 3/00* (2006.01)
*B64C 39/02* (2006.01)
*B64F 1/00* (2006.01)

(52) U.S. Cl.
CPC ............. *B64F 3/00* (2013.01); *B64C 39/022* (2013.01); *B64C 39/024* (2013.01); *B64F 1/00* (2013.01);
(Continued)

(58) Field of Classification Search
CPC ........ B64C 2201/027; B64C 2201/146; B64C 2201/148; B64C 39/022; B64C 39/024; B64F 3/00; B64F 1/00
See application file for complete search history.

(56) References Cited

U.S. PATENT DOCUMENTS 3,381,922 A * 5/1968 Laing ........................ B05B 3/18
239/171
3,987,987 A 10/1976 Payne
(Continued)

FOREIGN PATENT DOCUMENTS

CN    101081639    12/2007
CN    204043883    12/2014
(Continued)

OTHER PUBLICATIONS

UAV America: Custom Built UAVS/Drones; "Fyetech X4 Quad Tie Down Test_2.mp4" https://www.yutube.com/watch?v=OkE6xmroRQg, pulished on Oct. 16, 2011, pp. 1-3.
(Continued)

*Primary Examiner* — Justin M Benedik
(74) *Attorney, Agent, or Firm* — Fitch, Even, Tabin & Flannery, LLP

(57) ABSTRACT

An airborne drone training track includes both a ground track and a ceiling track. The ceiling track can be disposed above and be at least essentially aligned with the ground track. Airborne drone attachment tethers movably attach an airborne drone to each of these tracks. A lower airborne drone attachment tether movably attaches to the ground track and to a bottom portion of the airborne drone. A plurality of upper airborne drone attachment tethers movably attach to the ceiling track and to upper portions of the airborne drone. By one approach there is only one lower airborne drone attachment tether and four upper airborne drone attachment tethers.

17 Claims, 4 Drawing Sheets

(52) U.S. Cl.
CPC .. *B64C 2201/027* (2013.01); *B64C 2201/146* (2013.01); *B64C 2201/148* (2013.01)

(56) References Cited

U.S. PATENT DOCUMENTS

| | | | | |
|---|---|---|---|---|
| 4,036,147 A * | 7/1977 | Westling | ............ | B61B 15/00 |
| | | | | 104/107 |
| 4,920,791 A * | 5/1990 | Griffin | ............ | G01M 9/04 |
| | | | | 73/147 |
| 6,257,525 B1 * | 7/2001 | Matlin | ............ | A63H 27/04 |
| | | | | 244/137.4 |
| 6,647,161 B1 | 11/2003 | Hodge | | |
| 9,550,577 B1 | 1/2017 | Beckman | | |
| 9,573,684 B2 | 2/2017 | Kimchi | | |
| 2010/0308174 A1 * | 12/2010 | Calverley | ............ | B64C 27/02 |
| | | | | 244/155 A |
| 2011/0200974 A1 * | 8/2011 | Gluck | ............ | G09B 9/46 |
| | | | | 434/30 |
| 2015/0120094 A1 | 4/2015 | Kimchi | | |
| 2015/0277440 A1 | 10/2015 | Kimchi | | |
| 2016/0196755 A1 | 7/2016 | Navot | | |
| 2016/0257401 A1 | 9/2016 | Buchmueller | | |
| 2017/0110017 A1 | 4/2017 | Kimchi | | |

FOREIGN PATENT DOCUMENTS

| | | |
|---|---|---|
| RU | 2009145818 | 6/2011 |
| WO | 2014203593 | 12/2014 |

OTHER PUBLICATIONS

PCT; App. No. PCT/US2016/57597; International Search Report and Written Opinion; dated Jan. 17, 2017.

* cited by examiner

METHOD AND APPARATUS FOR AN
AIRBORNE DRONE TRAINING TRACK

CROSS-REFERENCE TO RELATED
APPLICATION

This application claims benefit of U.S. Provisional Application No. 62/247,010, filed Oct. 27, 2015, and is incorporated herein by reference in its entirety.

TECHNICAL FIELD

These teachings relate generally to airborne drones.

BACKGROUND

Airborne drones are known in the art. While some airborne drones operate autonomously, other airborne drones are at least substantially operated in real time by a ground-based pilot. The pilot typically conveys operating instructions to the airborne drone by a wireless communication path.

Generally speaking, such a pilot requires training in order to acquire the requisite piloting skills to enable safe and effective control of an airborne drone. While flight simulation platforms can be useful in these regards, in many cases it is useful or even necessary that a pilot-in-training operate an actual airborne drone.

Piloting errors during training are not unusual. A typical beginner's error is to over control the airborne drone with respect to speed of assent or descent and/or overall relative orientation of the craft. These expected tendencies present corresponding challenges in that many training facilities are indoors facilities. This is because of numerous and varied restrictions regarding the operation of airborne drones in open spaces. Operating an airborne drone inside a building or similar structure, however, presents the very real possibility of collisions between the airborne drone and the building itself. Such collisions can, in turn, necessitate time-consuming and/or costly repairs to the airborne drone or the building.

BRIEF DESCRIPTION OF THE DRAWINGS

The above needs are at least partially met through provision of the airborne drone training track described in the following detailed description, particularly when studied in conjunction with the drawings, wherein.

Figure 1:
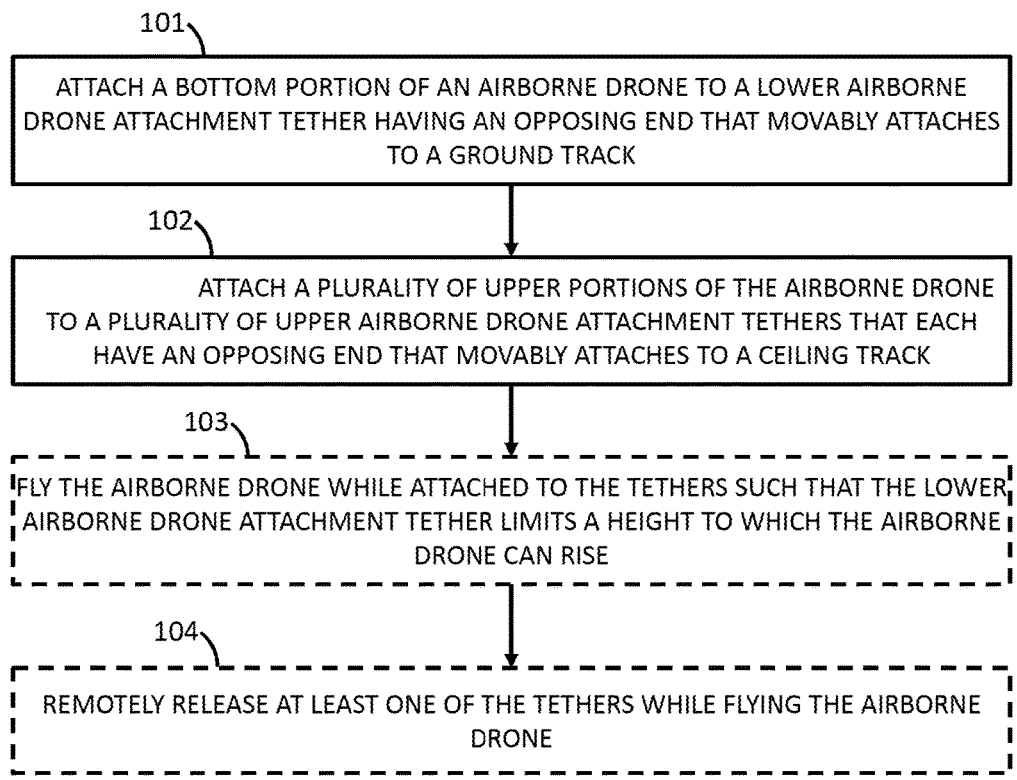
FIG. 1 comprises a flow diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, an airborne drone training track includes both a ground track and a ceiling track. The ceiling track can be disposed above and be at least essentially aligned with the ground track. Airborne drone attachment tethers movably attach an airborne drone to each of these tracks. A lower airborne drone attachment tether movably attaches to the ground track and to a bottom portion of the airborne drone. A plurality of upper airborne drone attachment tethers movably attach to the ceiling track and to upper portions of the airborne drone. By one approach there is only one lower airborne drone attachment tether and four upper airborne drone attachment tethers.

By one approach the aforementioned tracks comprise rails. When installed inside a building, the ground track can be attached, for example, to an indoor floor of the building. The ceiling track, in turn, can be attached to an indoor ceiling of the building.

The aforementioned tethers can be comprised of any of a variety of materials including flexible material or substantially nonelastic material. If desired, part or all of the outer surface of one or more of these tethers is colored to highly contrast with at least a majority of other surfaces that are located visually proximal (i.e., in the background of the pilot's field of view) in the airborne drone training track area.

These teachings are highly flexible in practice and will accommodate a wide range of variations and modifications. As one example in these regards, at least one of the upper airborne drone attachment tethers includes an auto-belay to prevent an attached airborne drone from moving downwardly at greater than a permitted speed. As another example, these teachings will accommodate remotely releasing one or more of the aforementioned tethers while flying the airborne drone.

So configured, movement (or even speed of movement in at least some directions) can be constrained while nevertheless providing considerable experience opportunities for a pilot in training. Accordingly, a pilot in training can learn through experience while also helping to ensure that the airborne drone itself does not collide with other nearby structures/obstacles. These precautions can help speed the training experience while simultaneously avoiding costly repairs.

These and other benefits may become clearer upon making a thorough review and study of the following detailed description. Referring now to the drawings, and in particular to FIG. 1, an illustrative process 100 that is compatible with many of these teachings will now be presented.

This process 100 can be carried out with respect to an airborne drone. As used herein, the expression "airborne" is not meant to refer to a current flying status of the drone but instead serves to characterize the drone as being a drone that is configured to perform controlled flight. This is to distinguish a flying drone from a terrestrial drone (i.e., a drone that is configured to perform land-borne movement). Airborne drones are a well understood though currently growing field of endeavor.

Figure 2:
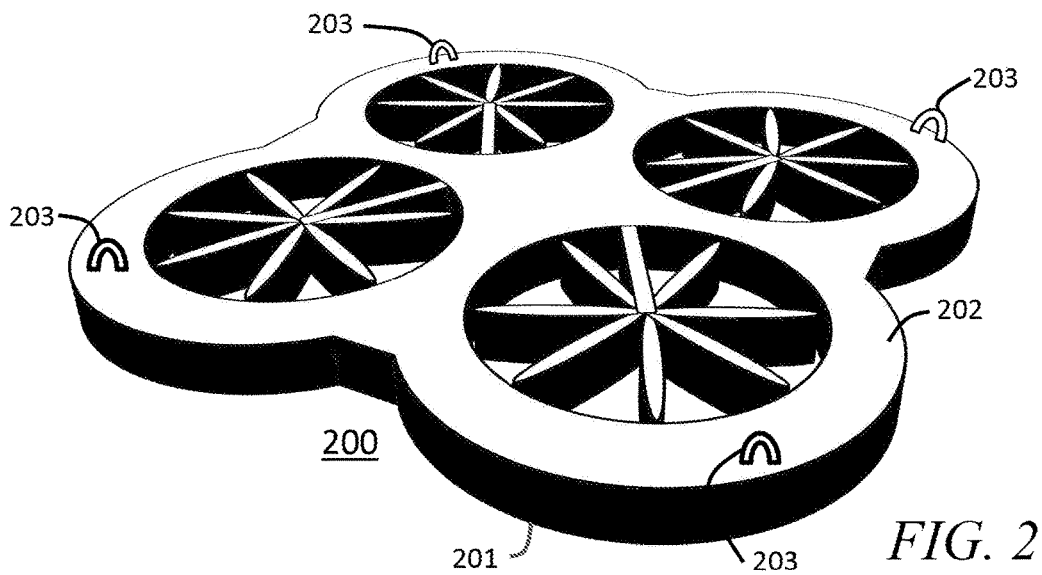
FIG. 2 comprises a perspective schematic view as configured in accordance with various embodiments of these teachings.

Referring momentarily to FIG. 2, an airborne drone 200 in this illustrative example has a lower portion 201 (i.e., a ground-facing portion comprising the underside of the drone 200) and an upper portion 202 (i.e., a sky-facing portion comprising the upper side of the drone 200). Tether attachment points are formed or otherwise disposed on the lower portion 201 and upper portion 202 of the airborne drone 200. In this illustrative example the lower portion 201 has only a single tether attachment point while the upper portion 202 has four tether attachment points 203 (the latter each being disposed approximately 90° apart from their next-adjacent attachment points).

These tether attachment points can assume any of a variety of form factors and are represented here by closed loops. Generally speaking these tether attachment points provide a mechanism for receiving and connecting to a tether as described below in more detail.

It shall be understood that the form factor of the airborne drone 200 presented in FIG. 2 is intended to serve in an illustrative manner and is not intended to suggest any limitations with respect to the size or shape of the airborne drone or with respect to the number or form factor of its rotors or other lift-providing mechanisms.

Figure 3:
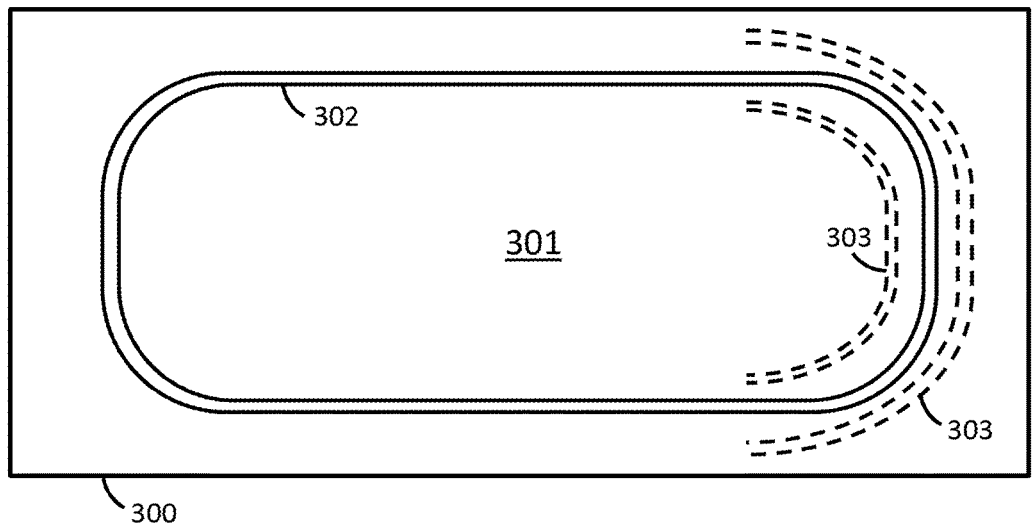
FIG. 3 comprises a plan view as configured in accordance with various embodiments of these teachings.

The process 100 presented in FIG. 1 can be employed in conjunction with an airborne drone training track. FIG. 3 presents some illustrative examples in these regards. By one approach, and viewing FIG. 3 as a top plan view, an oval-shaped track 302 is disposed on and attached to a surface 301 (in this example, a floor of the building 300) that comprises a part of a building 300. By another approach, and viewing FIG. 3 as a bottom plan view, the airborne drone training track includes an oval-shaped track 302 that is disposed on and attached to a surface 301 that comprises, in this example, a ceiling of the building 300.

Generally speaking, the airborne drone training track will include both a ceiling track and a ground track and these two tracks will be at least substantially aligned with one another. By one approach this can mean that the two tracks are vertically aligned with one (i.e., the ground track is at least very nearly located directly below the ceiling track).

By another approach this can mean that the two tracks are horizontally offset with one another, at least at some locations, while nevertheless generally tracking one another in terms of vertical alignment. For example, the two tracks may be horizontally offset by as much as 1 inch to 1 foot or more. The precise dimensions in these regards can vary with respect to the dimensions of the building 301, the dimensions of the airborne drone itself, and so forth.

By one approach, the ceiling track can comprise a plurality of rails as suggested by the phantom lines denoted by reference numeral 303. For example, the ceiling track can include an inner rail and an outer rail. The inner rail can be horizontally offset inwardly of the ground track while the outer rail can be horizontally offset outwardly of the ground rail. Other possibilities can certainly be accommodated.

In the example provided above the tracks are more or less oval-shaped. Gently-curved corners and relatively straight lines in particular can help to ensure smooth movement of a tether as described below as the airborne drone 200 moves with respect to the track. That said, other configurations can certainly be considered depending upon the needs and/or opportunities that tend to characterize a given application setting.

By one approach the ground and ceiling tracks comprise a simple straight length of tubing. The tubing is mounted such that there is space between the tubing and the adjacent surface (for example, the adjacent floor or ceiling). In this case, a tethered airborne drone 200 can move linearly in a forward or rearward direction as compared to the previously-described track configuration that will accommodate permitting the airborne drone 200 to make turns.

Figure 4:
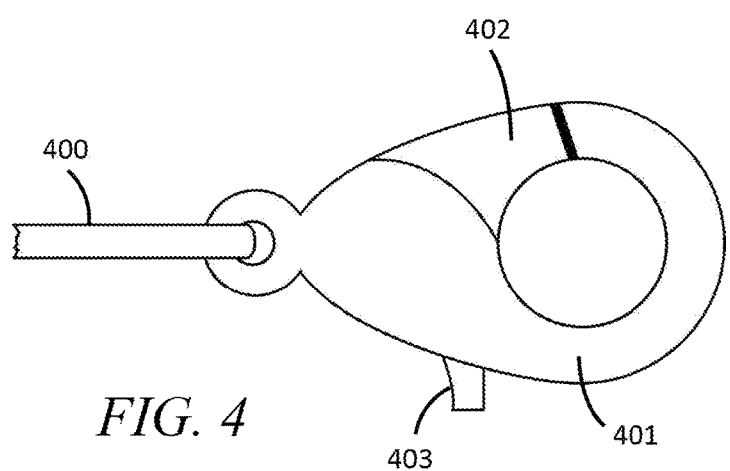
FIG. 4 comprises a top plan detail view as configured in accordance with various embodiments of these teachings.

Referring again to FIG. 1, at block 101 this process 100 provides for attaching a bottom portion 201 of the airborne drone 200 to a lower airborne drone attachment tether. Referring momentarily to FIG. 4, by one approach the tether 401 is attached at one (or both) of its opposing ends to a hook 401. In this illustrative example the hook 401 includes a user-manipulable portion 403 by which a movable portion 402 can be moved between a fully closed orientation (as illustrated) and an opened orientation. When open the hook 401 can readily engage a tether attachment point on the airborne drone 200 as described above. When closed the hook 401 securely attaches the tether 400 to the airborne drone 200.

These teachings will accommodate any number of attachment configurations or other attachment mechanisms as desired. Accordingly, it will be understood that the specific example provided in FIG. 4 is intended to serve an illustrative purpose and is not intended to suggest any particular limitations in these regards. By another approach, if desired, the free end of the tether 400 can simply be tied to a corresponding attachment point on the airborne drone 200 via an appropriate knot of choice.

Block 101 of the illustrative process 100 also provides for removably attaching an opposing end of the tether 400 to a ground track as described above. By one approach this can simply comprise looping the tether 400 around a corresponding portion of the ground track and using a knot or other securement mechanisms to hold the loop loosely about the ground track.

Figure 5:
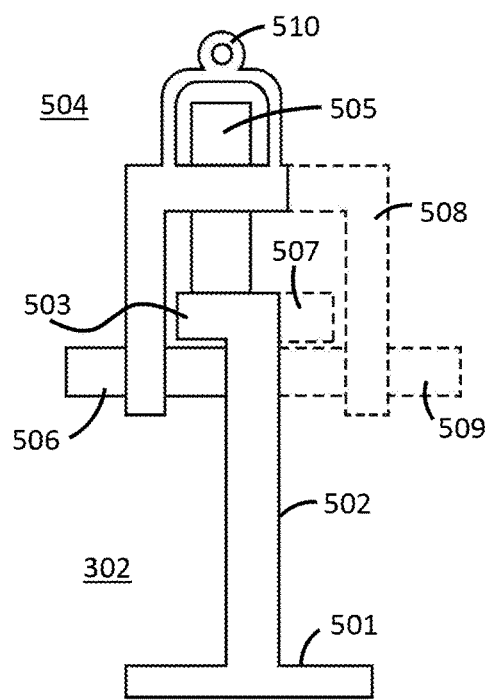
FIG. 5 comprises a side elevational view as configured in accordance with various embodiments of these teachings.
Figure 6:
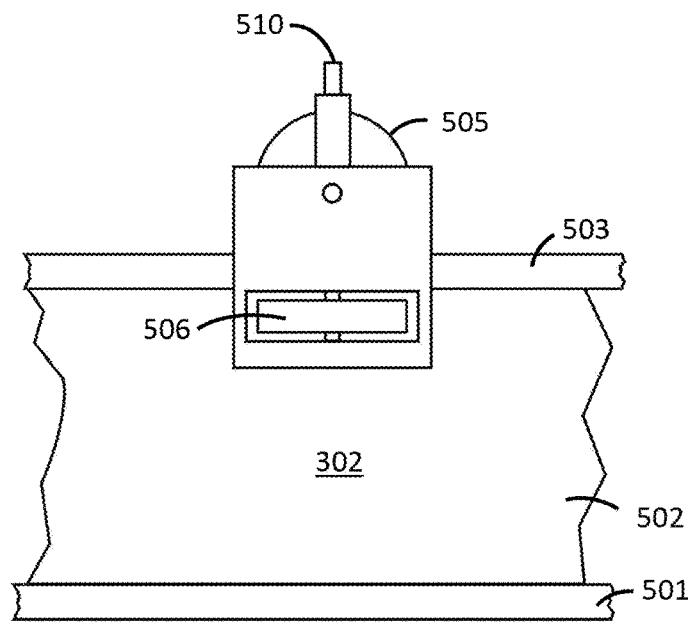
FIG. 6 comprises a front elevational view as configured in accordance with various embodiments of these teachings.

By another approach, the tether 400 can be attached to the ground track using a corresponding movable attachment point. FIGS. 5 and 6 presents an illustrative example in these regards. It will be understood that the specifics of this illustrative example are intended to serve only in an illustrative manner and are not intended to suggest any particular limitations in these regards.

In this example the track 302 comprises a rail having a foot 501, a web 502, and a head 503. The foot 501 essentially comprises a plate that can rest conformally atop, for example, a floor. By one approach the foot 501 includes holes disposed there through to receive attachment members that can secure the foot 501 to the surface upon which the foot 501 rests.

The web 502 essentially comprises a vertical plate that extends at a perpendicular angle away from the foot 501. This web 502 can comprise a contiguous, solid surface or can include apertures formed there through if desired.

The head 503 comprises a small tab that extends outwardly from and perpendicular to the web 502. This tab helps to captivate a wheel assembly 504.

The wheel assembly 504 essentially comprises a carriage assembly having a first rotatable wheel 505 and a second rotatable wheel 506. The first rotatable wheel 505 is aligned parallel to the web 502 such that its rotating surface contacts the head 503. The second rotatable wheel 506 is aligned perpendicular to the web 502 such that its rotating surface contacts the web 506. The wheel assembly 504 is sized and configured to help arrange and maintain the aforementioned positions.

By one approach, the head includes an additional tab 507 that extends outwardly from and opposite the aforementioned tab, thereby essentially forming a T-shaped structure. The wheel assembly 504 can include an additional fork member 508 that rotatably supports a third wheel 509. That third wheel 509 is aligned perpendicular to the web 502 such that its rotating surface contacts the web 506. In this illustrative example the third wheel 509 is aligned essentially opposite the second rotatable wheel 506. So configured, the wheel assembly 504 is captivated with respect to the track 302 but is readily able to move along the track 302 in either a forward or rearward direction.

In this example the wheel assembly 504 includes a tether attachment point 510 comprising a circular shaped opening. So configured the aforementioned tether 400 can be tied to the wheel assembly 504 or attached thereto via, for example, the aforementioned hook 401 or other attachment mechanism of choice.

Referring again to FIG. 1, and again as per block 101, a tether is attached to the bottom portion 201 of the airborne drone 200 and also to the aforementioned ground track. The tether itself can have any desired length. Generally speaking, however, the length of the lower airborne drone attachment tether will be less than the height of the ceiling or other overhead obstructions. So configured, the lower airborne drone attachment tether can prevent the airborne drone 200 from rising high enough to hit such an obstacle.

The location point for attaching the lower airborne drone attachment tether to the airborne drone 200 can vary as desired. Generally speaking, it can be useful for that location point to be located more or less centrally with respect to the airborne drone 200.

At block 102 this process 100 then provides for attaching a plurality of upper portions 202 of the airborne drone 200 to a plurality of upper airborne drone attachment tethers that are each in turn movably attached to the ceiling track. These attachment points from the airborne drone 200 can comprise, for example, attachment point openings as described above with respect to FIG. 2.

Figure 7:
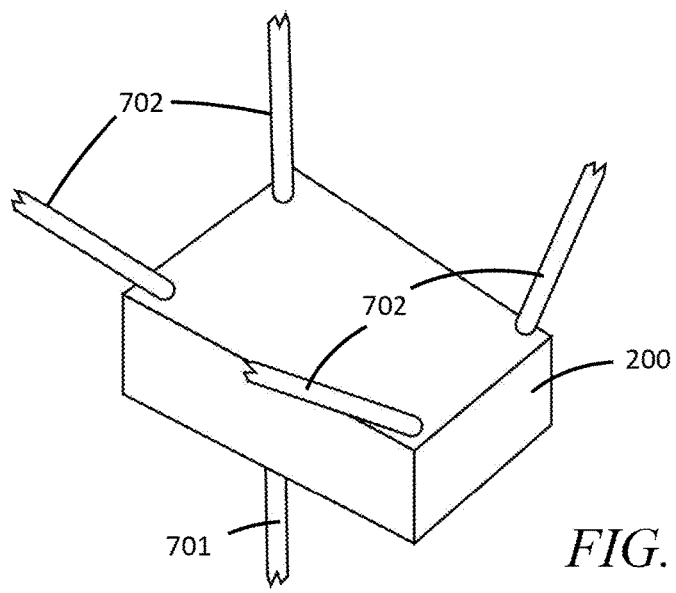
FIG. 7 comprises a perspective block diagram as configured in accordance with various embodiments of the invention.

FIG. 7 presents a block diagram depiction in the foregoing regards. In this example, the lower airborne drone attachment tether 701 is shown to connect more or less centrally on the underside of the airborne drone 200 and the upper airborne drone attachment tethers 702 are shown to connect, more or less, at opposing "corners" of the airborne drone 200 (it being understood that a typical airborne drone 200 does not literally have well-defined specific corners). By one approach, and by way of example, two of the upper airborne drone attachment tethers 702 can be coupled to an inner ceiling-mounted track and two of the upper airborne drone attachment tethers 702 can be coupled to an outer ceiling-mounted track. Again, these teachings will accommodate a variety of track form factors and attachment mechanisms including the use of a rail and carriage assembly approach as described above with respect to FIGS. 5 and 6.

By one approach one or more of the upper airborne drone attachment tethers 702 includes an auto-belay to prevent an attached airborne drone 200 from moving downwardly at greater than a permitted speed. Auto-belays are generally well understood in the art. As the present teachings are not overly sensitive to any particular selections in these regards, no further elaboration regarding auto-belays is provided here.

At block 103 this process 100 provides for flying the airborne drone 200 while attached to the aforementioned tethers such that the lower airborne drone attachment tether 701 limits a height to which the airborne drone 200 can rise. Similarly, the upper airborne drone attachment tethers 702 can help to limit and control movement of the airborne drone 200 and in particular can serve to limit the speed at which the airborne drone 200 can move downwardly (to thereby help avoid contact between the airborne drone 200 and the floor at speeds that may cause damage to one or both). Configured as described herein, these tethers 701 and 702 do not prevent the airborne drone 200 from moving in a generally forward or rearward direction with respect to the aforementioned tracks.

Figure 8:
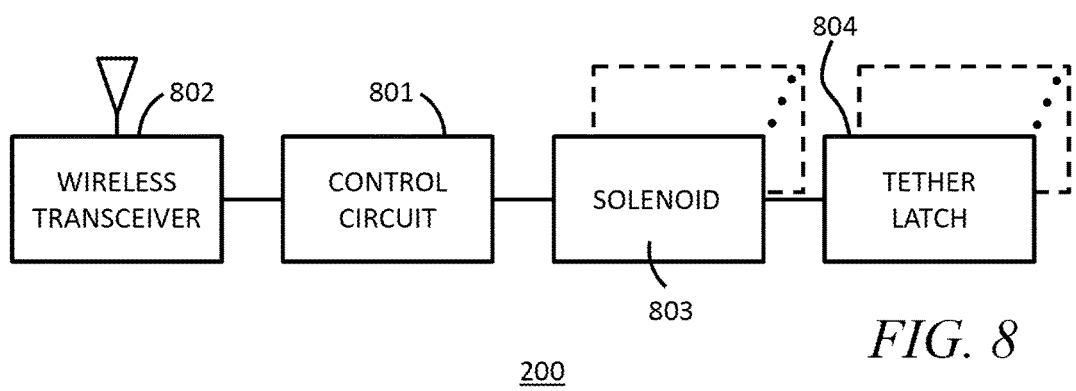
FIG. 8 comprises a block diagram as configured in accordance with various embodiments of these teachings.

By one optional approach, illustrated at optional block 104, this process 100 will accommodate remotely releasing one or more of the aforementioned tethers while flying the airborne drone 200. This can comprise releasing only one of the tethers (such as the lower airborne drone attachment tether) or up to and including releasing all of the tethers (including the lower airborne drone attachment tether and all of the upper airborne drone attachment tethers). To facilitate such activity, and as illustrated in FIG. 8, the airborne drone 200 can include a control circuit 801.

Being a "circuit," the control circuit 801 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 801 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 801 is configured (for example, by using corresponding programming as will be well understood by those skilled in the art) to carry out one or more of the steps, actions, and/or functions described herein.

This control circuit 801 can operably couple to a wireless transceiver 802 to thereby compatibly receive one or more remote control instructions from a wireless transmitter (not shown) employed by a pilot in training or an instructor. The control circuit 801 can also operably couple to one or more solenoids 803 that in turn control the locked and unlocked state of a corresponding tether latch 804. When locked, the tether latch 804 can retain the corresponding tether in an attached state to the airborne drone 200. When unlocked, the tether latch 804 can release the corresponding tether and hence actively detach the tether from the airborne drone 200.

Such a tether latch 804 can serve as any of the above-described tether attachment points for the airborne drone 200.

So configured, and by way of example, an instructor can release one or more of the tethers while a pilot in training is controlling the airborne drone 200. An instructor may take this action, for example, upon concluding that the pilot in training is demonstrating sufficient control of the airborne drone 200 to make at least some collisions less likely.

Again, these teachings are highly flexible in practice. For example, by one approach at least substantially all of the outer surface of the tethers (such as at least 51%, 75%, 90%, or 100%) are colored or otherwise visually marked or patterned to highly contrast visually with at least a majority (such as at least 51%, 75%, 90%, or 100%) of other surfaces (such as interior walls for the building 300) that are located visually proximal to the airborne drone training track. For example, the interior walls of the building 300 may be painted white, a light yellow, or other feint color while the tethers are colored a bright fluorescent orange or green. So colored, the tethers can be more readily viewed by the pilot in training and/or an instructor and may also be useful when viewing archival footage of the training session.

These teachings are relatively simple to implement and need only require a modest capital investment. In turn, these teachings can greatly reduce the number of collisions and crashes that typically characterize the learning curve of a pilot in training. Accordingly, these teachings can avoid the need for time-consuming and costly repairs to airborne drones and/or other objects in the training area.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. An airborne drone training track comprising:
    a ground track;
    a ceiling track disposed above and at least substantially aligned with the ground track;
    a lower airborne drone attachment tether having a first end movably attached to the ground track and a second end configured to attach to a bottom portion of an airborne drone;
    a plurality of upper airborne drone attachment tethers, each having a first end movably attached to the ceiling track and a second end configured to attach to an upper portion of the airborne drone.

2. The airborne drone training track of claim 1 wherein the ground track comprises at least one rail and wherein the ceiling track comprises at least one rail.

3. The airborne drone training track of claim 1 wherein the ground track is attached to an indoor floor of a building.

4. The airborne drone training track of claim 3 wherein the ceiling track is attached to an indoor ceiling of the building.

5. The airborne drone training track of claim 1 wherein the tethers comprise a flexible material.

6. The airborne drone training track of claim 5 wherein the tethers are substantially nonelastic.

7. The airborne drone training track of claim 1 wherein at least substantially all of the outer surface of the tethers are colored to highly contrast with at least a majority of other surfaces that are located visually proximal to the airborne drone training track.

8. The airborne drone training track of claim 1 wherein the lower airborne drone attachment tether is the only lower airborne drone attachment tether and wherein the plurality of upper airborne drone attachment tethers consists of only four upper airborne drone attachment tethers.

9. The airborne drone training track of claim 1 wherein the lower airborne drone attachment tether has a length that is shorter than the height of the ceiling track above the ground track and wherein at least one of the upper airborne drone attachment tethers includes an auto-belay to prevent an attached airborne drone from moving downwardly at greater than a permitted speed.

10. A method comprising:
    attaching a bottom portion of an airborne drone to a lower airborne drone attachment tether having an opposing end that movably attaches to a ground track;
    attaching a plurality of upper portions of the airborne drone to a plurality of upper airborne drone attachment tethers that each have an opposing end that movably attaches to a ceiling track.

11. The method of claim 10 further comprising:
    flying the airborne drone while attached to the lower airborne drone attachment tether and to the plurality of upper airborne drone attachment tethers, such that the lower airborne drone attachment tether limits a height to which the airborne drone can rise.

12. The method of claim 11 wherein at least one of the plurality of upper airborne drone attachment tethers includes an auto-belay, such that the at least one of the plurality of upper airborne drone attachment tethers prevents the flying airborne drone from moving downwardly at greater than a permitted speed.

13. The method of claim 12 further comprising:
    remotely releasing at least one of the tethers while flying the airborne drone.

14. The method of claim 13 further comprising:
    remotely releasing all of the tethers while flying the airborne drone.

15. An airborne drone having an upper portion and a lower portion, and further comprising:
    at least one lower tether attachment point disposed on the lower portion, the at least one tether attachment point attached to a lower airborne drone attachment tether having an opposing end movably attached to a ground track;
    a plurality of upper tether attachment points disposed on the upper portion, the plurality of upper tether attachment points each attached to an upper airborne drone attachment tether having an opposing end movably attached to a ceiling track.

16. The airborne drone of claim 15 wherein the lower portion has only one lower tether attachment point and the upper portion has exactly four upper tether attachment points.

17. The airborne drone of claim 15 wherein the tether attachment points each comprise a remotely releasable attachment point configured to release an attached tether in response to a remote control signal.

* * * * *